United States Patent [19]

Ota

[11] Patent Number: 4,672,798
[45] Date of Patent: Jun. 16, 1987

[54] APPARATUS FOR CUTTING GRASS

[75] Inventor: Keizo Ota, Ibaragi, Japan

[73] Assignee: Shingu Shoko, Ltd., Otaru, Japan

[21] Appl. No.: 866,503

[22] Filed: May 23, 1986

[30] Foreign Application Priority Data

May 24, 1985 [JP] Japan .................................. 60-110248
Mar. 7, 1986 [JP] Japan .................................. 61-48624
Mar. 11, 1986 [JP] Japan .................................. 61-51494

[51] Int. Cl.⁴ ........................ B26B 7/00; A01D 35/26
[52] U.S. Cl. ........................................ 56/12.7; 30/276
[58] Field of Search ...................... 30/276, 347; 56/12.7

[56] References Cited

U.S. PATENT DOCUMENTS

| 4,203,212 | 5/1980 | Proulx ................................... 56/12.7 |
| 4,209,902 | 7/1980 | Moore et al. ........................ 56/12.7 |
| 4,274,201 | 6/1981 | Oberg et al. ......................... 56/12.7 |
| 4,419,822 | 12/1983 | Harris ................................... 56/12.7 |

*Primary Examiner*—Gene Mancene
*Assistant Examiner*—David I. Tarnoff
*Attorney, Agent, or Firm*—Armstrong, Nikaido, Marmelstein & Kubovcik

[57] ABSTRACT

An apparatus for cutting grass having a rotatable head and cords extending from the rotatable head. The head accommodates a reel within a chamber defined by the head. The cords are payed out through outlets formed in the head only when the head rotation is stopped and the head is simply bumped against the ground. The bottom of the head is formed with an opening through which a downwardly biased depressing member projects from inside the head. This depressing member is connected to the reel. Between the ceiling of the head and any one of depressing member and the reel is provided a pair of ratchet teeth mechanisms which allow the rearward rotation of the reel when the reel and the depressing member normally biased downwardly is depressed against the ground. The above ratchet mechanisms performs the reverse rotation of the reel through their guiding structure.

9 Claims, 24 Drawing Figures

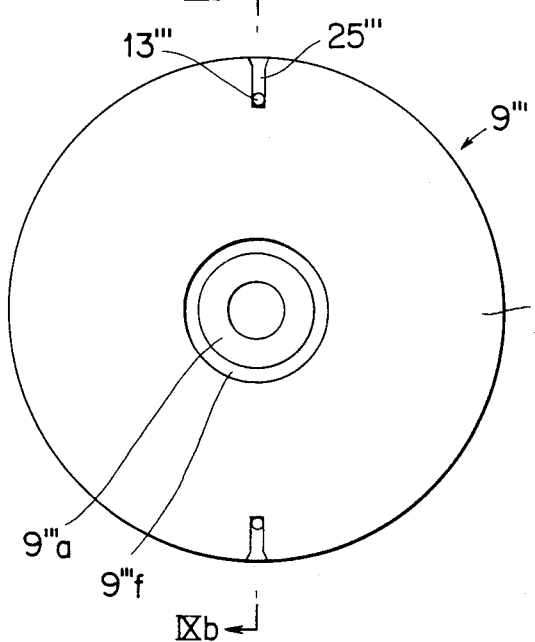
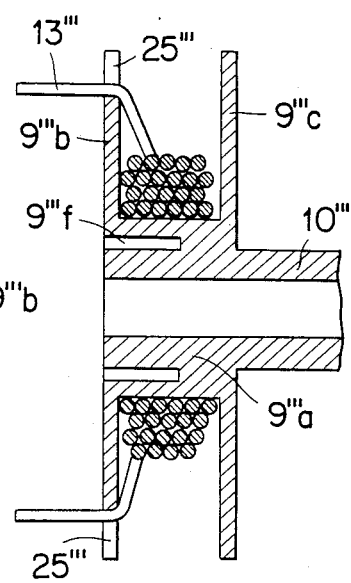
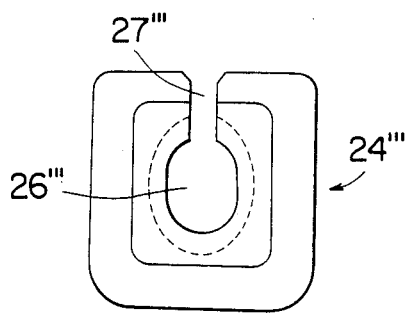
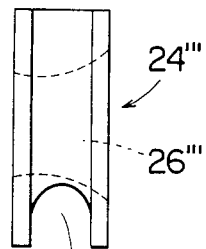
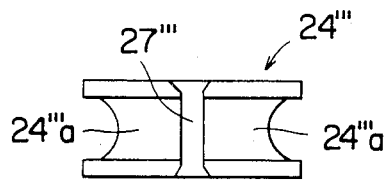
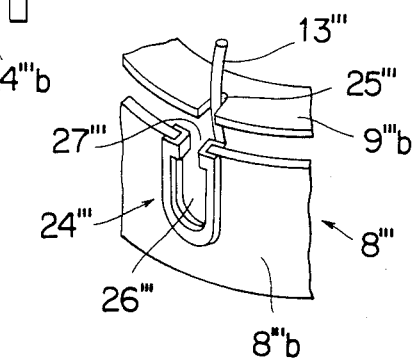

APPARATUS FOR CUTTING GRASS

BACKGROUND OF THE INVENTION

The present invention relates to an apparatus for cutting grass and more particularly, it relates to an apparatus for cutting grass which has a prime mover connected to one end of a tube and has a rotatable head connected to the other end of the tube through a gear housing. The rotatable head has a cord extending radially therefrom under centrifugal force for cutting grass on rotation.

Conventionally in an apparatus of this type, as means for extending a cord whose free end is worn out to shorten, there has been proposed means for paying out the cord to a desired length by stopping the rotation of a rotatable head and releasing a locking means to manually drawing the cord (Japanese Patent Application Publication (Kokoku) No. 54-17651). Further, there has been proposed means for automatically extending a cord without stopping the rotation of a rotable head by depressing a depressing member mounted on the reel carrying the coiled cord against the ground or the like to disengage the reel from the rotatable head and to rotate the reel by one step by centrifugal force (Japanese Patent Application Publication (Kokai) No. 57-5608).

The operation in the former method, however, is in need of troublesome procedures to follow; the rotation of the rotatable head is stopped before the cord is manually payed out. Further, in the latter case, it is efficient to automatically pay out the cord by only depressing the depressing member against the ground or the like, without stopping the rotation of the rotatable head. However, since the cord is automatically payed out under centrifugal force, the operation of the engaging mechanism for extending the cord by one step may not be effected normally. As a result, the cord is extended to an unnecessary length and some danger in its operation is involved.

SUMMARY OF THE INVENTION

In order to solve the above mentioned problems, there is provided in one aspect of the invention an apparatus for cutting grass comprising a rotatable head rotatable about an axis in a predetermined direction, said rotatable head connected to a drive source through switch means, said rotatable head including an upper case and a lower case releasably engaged with each other, said upper case and said lower case having respective inner surfaces, said lower case having an opening at a central bottom portion thereof; a reel supported within said head slidably along said axis and wound with at least one cord therearound, said at least one cord being wound in a direction reverse to said predetermined direction, said reel having an upper flange and a lower flange, said upper flange and said lower flange having upper and lower outer surfaces, respectively; a depressing member extending from said reel and normally biased toward said central bottom portion of the lower case to project outside the rotatable head through said opening; a plurality of first ratchet teeth formed in said upper outer surface of said upper flange and a plurality of second ratchet teeth formed in said inner surface of said upper case, said first and second ratchet teeth being formed annularly to face each other, each first tooth having a first slant surface facing forwardly and a first tip formed at a rearwardmost end of said first slant surface with respect to the head rotation in said predetermined direction, each second tooth having a second slant surface facing rearwardly and a second tip formed at a forwardmost end of said second surface; and a plurality of recesses formed in said inner surface of said lower case and a plurality of projections formed in said lower outer surface of said lower flange, said recesses and said projections being sized to permit engagement with each other: and said second ratchet teeth of the upper case and said recesses of the lower case being spaced from each other by a predetermined distance such that engagement of said first with second ratchet teeth and engagement of said recesses with projections are selectively accomplished, said first tip of each first tooth being positioned rearwardly out of phase with said second tip of each second ratchet tooth during said engagement of said recesses with projections while said rotatable head is rotated.

In another aspect of the invention, there is provided an apparatus for cutting grass comprising a rotatable head rotatable about an axis in a predetermined direction, said rotatable head being connected to a drive source through switch means, said rotatable head including an upper case and a lower case releasably engaged with each other, said upper case and said lower case having respective inner surfaces, said lower case having an openning at a central bottom portion thereof; a reel supported within said head coaxially therewith and wound with at least one cord therearound, said at least one cord wound in a direction reverse to said predetermined direction, said reel having an upper flange and a lower flang; a depressing member releasably attached within said reel and normally biased toward said central bottom portion of the lower case to project outside the rotatable head through said opening, said depressing member having a brim portion formed in a longitudinally intermediate portion thereof to overhang said inner surface of the lower case, said brim portion having a lower surface facing said inner surface of the lower case, said depressing member further having a top portion above said brim portion to face said inner surface of the upper case; a plurality of first ratchet teeth formed in said top portion and a plurality of second ratchet teeth formed in said inner surface of the upper case, said first and second ratchet teeth being formed annularly to face each other, each first tooth having a first slant surface facing forwardly and a first tip formed at a rearwardmost end of said first slant surface with respect to the head rotation in said predetermined direction, each second tooth having a second slant surface facing rearwardly and a second tip formed at a forwardmost end of said second surface; and a plurality of recesses formed in said inner surface of said lower case and a plurality of projections formed in said lower surface of said brim portion, said recesses and projections being sized to permit engagement with each other: and said second ratchet teeth of the upper case and said recesses of the lower case being spaced from each other by a predetermined distance such that engagement of said first with second ratchet teeth and engagement of said recesses with projections are selectively accomplished, said first top of each first tooth being positioned rearwardly of said second tip of each second ratchet tooth during said engagement of said recesses with projections when said rotatable head is rotated.

BRIEF DESCRIPTION OF THE DRAWINGS

FIG. 5b is a side elevational view of the depressing memeber of FIG. 5a;

FIG. 9a is a plan view of the reel used in a still further embodiment of the invention;

FIG. 9b is a sectional view taken along line IXb—IXb in FIG. 9a;

FIG. 10a is a front view of the eyelet used in the embodiment of FIG. 9a;

FIG. 10b is a side elevational view of the eyelet of FIG. 10a;

FIG. 10c is a plan view of the eyelet of FIG. 10a; and

FIG. 11 is a perspective view showing the positional relationship of the slit 25 shown in FIG. 9a and the eyelet shown in FIG. 10a through FIG. 10c.

PREFERRED EMBODIMENTS OF THE INVENTION

Figure 1:
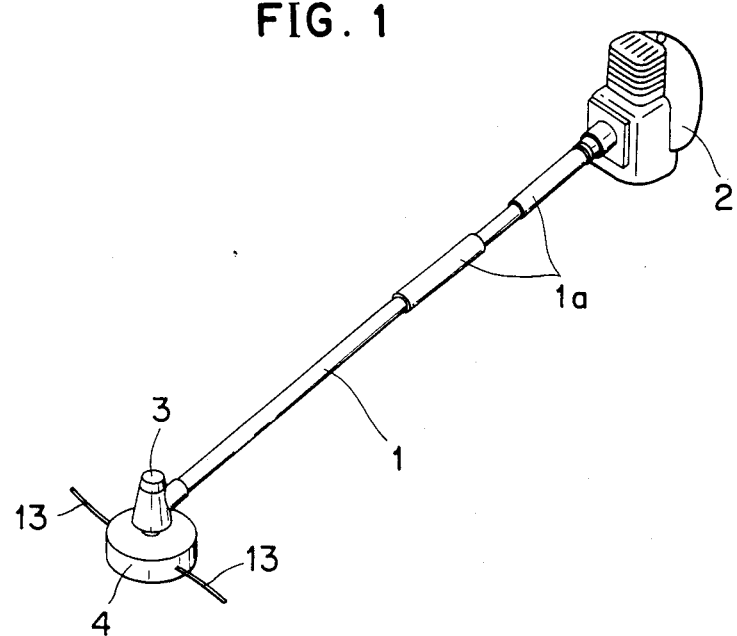
FIG. 1 is a pictorial view of the apparatus for cutting grass.

One embodiment of the present invention will be described in conjunction with FIGS. 1 through 3. In the above drawings, reference numeral 1 represents a tube having a grip 1a; 2, a prime mover as a drive source mounted on the upper end portion of the tube 1; 3, a gear housing mounted on the lower portion of the tube 1; 4, a rotatable head rotatable through an output shaft within the gear housing 3. The rotatable head is designed to rotate a transmission mechanism (not shown) such as a driving shaft and a chain wheel extending through a clutch mechanism and the tube from the prime mover 2.

Figure 2:
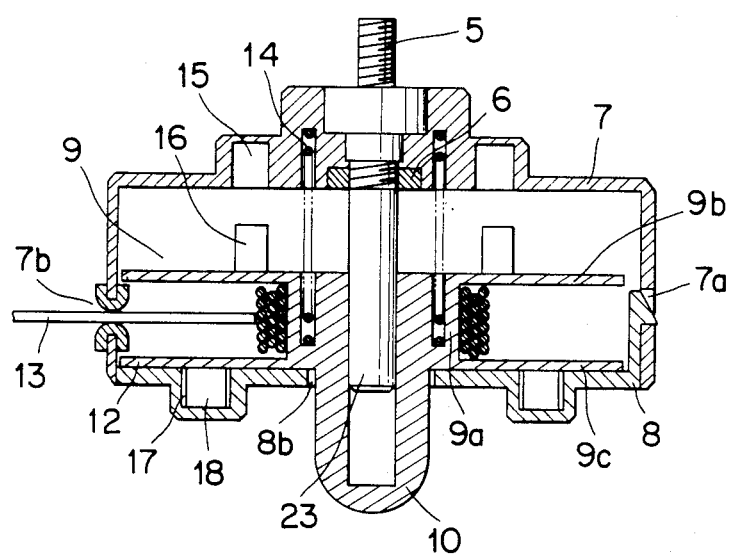
FIG. 2 is a vertical sectional view showing one embodiment of the present invention.

The rotatable head 4 comprises, as shown in a vertical sectional view of FIG. 2, a cylindrical upper case 7 which is securely attached to the output shaft 5 from the gear housing 3 by means of nuts 6 and a lower case 8 releasably attached to the upper case by engaging recess 7a with a projection 8a formed opposite to each other at their peripheral surfaces. With this structure, said head 4 is rotated by the prime mover 2 in a predetermined direction. Said upper case 7 has a top wall and a peripheral wall whereas said lower case 8 has a bottom portion and a peripheral wall. Within a chamber defined by the cylindrical upper case 7 and the lower case 8, there is provided a reel 9. Said reel 9 has a bore in a center thereof into which the output shaft 5 is inserted to allow a rotation of the reel 9 thereabout and a slidable movement of the same in an axial direction. A depressing member 10 projecting outwardly from a guide opening 8b formed in the center of the bottom portion of the lower case 8 is formed integral with the lower portion of the reel 9. The reel 9 has an upper flange 11 and a lower flange 12 formed integral therewith. Two lines of cord 13 of synthetic resin are wound in the reverse direction to the rotating direction of the rotatable head between the upper flange 11 and the lower flange 12. Each free end of the lines is extended outwardly from each of two guide apertures formed in the peripheral wall of the upper case 7.

A coil spring 14 is interposed between the inner surface of the top wall of the upper case 7 and the depressing member 10 integral with the reel 9. By virtue of downward biasing of the spring 14, the lower flange 12 of the reel 9 is urged to the inner bottom surface of the lower case 8 and the depressing member 10 is caused to project outwardly through the guide opening 8b of the lower case 8. Annular rachet mechanisms 15, 16 formed in the inner surface of the upper case 7 and the upper reel flange are arranged in facing relation to each other around the coil spring 14. Annular engaging mechanisms 17 and 18 for engaging and disengaging the reel with and from the head 4 are formed in facing relation to each other in the inner bottom surface of the lower case 8 and the lower outer surface of the lower flange 12.

The respective rachet mechanisms 15 and 16 comprise eight ratchet teeth 19 and 20 both arranged in a circle with equal angular spacings. Each rachet tooth 19 has a vertical surface $19_1$, a slant surface $19_2$ and a tip $19_3$. Said slant surface $19_2$ faces rearwardly with respect to the head rotation as arrow-marked in FIG. 3a. Said tip $19_3$ is formed at the forwardmost end of said slant surface $19_2$. On the other hand, each rachet tooth 20 has a vertical surface 20, a slant surface $20_2$ and a tip $20_3$. Said slant surface $20_2$ faces forwardly with respect to the head rotation. Said tip $20_3$ is formed at the rearwardmost end of said slant surface $20_2$. The respective engaging mechanisms 17 and 18 comprise eight recesses 21 and eight projections 22 both arranged in a circle with equal angular specings and sized to permit engagement with other. Each recess 21 has a vertical rearward surface 21a, a slant forward surface 21b and flat surface 21c therebetween whereas each projection 22 has a vertical rearward surface 22a, a slant forward surface 22b and a flat surface 22c therebetween.

Figure 3A:
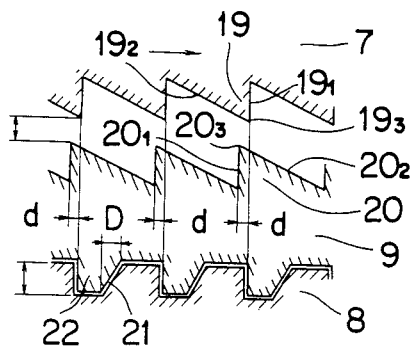
FIGS. 3a through 3d show the change in positional relationship between elements inside the head at the time of the paying out operation of the cord in the embodiment of FIG. 2.

FIG. 3a shows the state that the rachet teeth 20 of the reel are released from the rachet teeth 19 of the upper case 7 and the projections 22 of the reel 9 are engaged with the recesses 21 of the lower case 8 due to the dowanward biasing of the coil spring 14.

The rotatable head 4 is rotated in the arrowed direction in the state in which the projections 22 are in mesh with the recesses 21 so that the reel 9 is rotated together with the rotatable head 4 in the same direction. As a result, centrifugal force works on the cord 13 to make the same radially extend through the guide aperture 7b for effecting the cutting operation.

In this case, as described above, the wound cord 13 will not loosen even if the portion extending outside is subjected to centrifugal force since the cord 13 is wound around the reel 9 in the reverse direction to the rotating direction of the rotatable head.

Further, as shown in FIGS. 3a through 3d, the rachet teeth 19 and 20 and the recesses 21 and projections 22 are formed as follows:

(a) The slant surfaces $19_2$ of the serrated ratchet teeth 19 are formed to face the slant surfaces $20_2$ of the serrated ratchet teeth 20 such that said slant surfaces act as guide surfaces to rotate the reel 9 stepwise for loosening the wound cord 13; that is, in the direction opposite to the head rotation as arrow-indicated in FIG. 3a.

(b) The tips $19_3$ of the ratchet teeth 19 are formed in the same phase as the vertical surfaces 21a of the recesses 21 while the slant surfaces $20_2$ of the ratchet teeth 20 in part extends such that the tips $20_3$ of the ratchet teeth 20 are rearwardly out of phase with the vertical surfaces 22a with respect to the head rotation by a distance d. Therefore, the tips $20_3$ are positioned rearwardly of the tips $19_3$ of the ratchet teeth 19 in the position shown in FIG. 3a. Further, a horizontal width D of the slant forward surfaces 21b and 22b of the recesses 21 and of the projection 22 are formed larger than the distance d. The reel 9 slides down the slant forward surfaces 21b to ensure that the tip $20_3$ of each tooth 20 is rearwardly out of phase with the tip $19_3$ of each tooth 19 to place the reel in a position ready for initial engagement with the upper case 7 if the upper case 7 decends.

(c) Said ratche teeth 19 and the recesses 21 must be spaced apart from each other such that the engagement of the ratchet teeth 19 with ratchet teeth 20 and the engagement of recesses 21 with projections 22 are selectively accomplished.

Figure 3B:
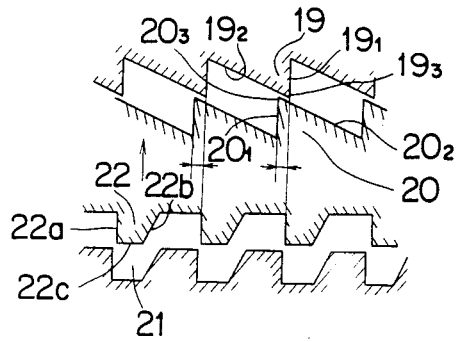
Figure 3C:
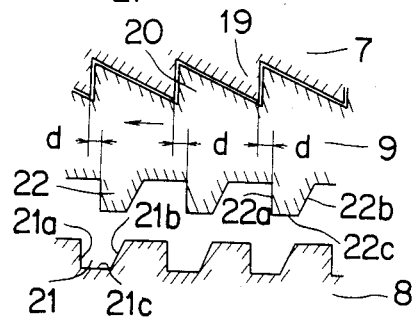
Figure 3D:
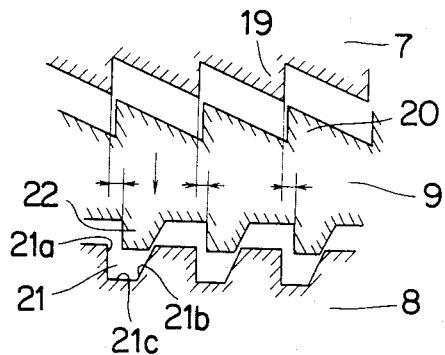

Referring to FIGS. 3b through 3d, when the rotation of the rotatable head 4 is stopped (the prime mover 2 remains idling) and the depressing member 10 is pushed against the ground or the like, the reel 9 rises against the coil spring 14 relative to the head 4 in an arrowed direction as shown in FIG. 3b. As a result, the ratchet teeth 20 of the reel 9 come into engagement with the ratchet teeth 19 of the main body 7 by the interval d while the projections 22 are disengaged from the recesses 21. When the depressing member 10 is further pushed against the ground or the like, the ratchet teeth 20 are guided to the left by the ratchet teeth 19 in an arrowed direction as shown in FIG. 3c. That is, the reel 9 performs a stepwise rotation rearward or in a direction to loosen the winding of the cord 13 before being stopped. Accordingly, the wound cord 13 is loosned by one increment. When the depression of the depressing member 10 is released in this state, the reel 9 decends relative to the head 4 in an arrowed direction by biassing of the coil spring 14, as shown in FIG. 3d. However, as apparent from the relationship D>d, the projections 22 are engaged with the recesses 21 by sliding down the slant surfaces to return to the state as shwon in FIG. 3a. Further, when the rotatable head 4 is rotated again, the loosened length of the cord 13 (corresponding to the length of said one increment by the ratchet teeth 19, 20) is automatically drawn through the guide aperture 7b of the rotatable head 4 by the centrifugal force upon the head rotation.

While, in the embodiment as described above, the number of the ratchet teeth and the recesses and projections is eight, respectively, the number may be varied depending on the length of the extended cord. Also, in the above embodiments the vertical sides of the ratchet teeth 19 and the recesses 21 are formed in the same phase while the slant surfaces of the ratchet teeth 20 in part extend such that the vertical surfaces of the ratchet teeth 20 are out of phase rearwardly with respect to the head rotation by an interval d from the vertical sides of the ratchet teeth 19 during the engagement of the recesses 21 and the projections 22. Alternatively, the vertical surfaces $20_1$ and 22a of the retchet teeth 20 and the projections 22 are formed in the same phase while the vertical surfaces 21a of the recesses 21 are formed out of phase rearwardly with respect to the head rotation by an interval d from the vertical surfaces $19_1$ of the ratchet teeth 19. As a result, the same effect as in the present invention is obtained.

A second embodiment of the invention will be described in conjunction with the drawings including FIG. 4 through FIG. 7d. The general structure of the second embodiment is substantially the same as that of the first embodiment as shown in FIG. 1.

Figure 4:
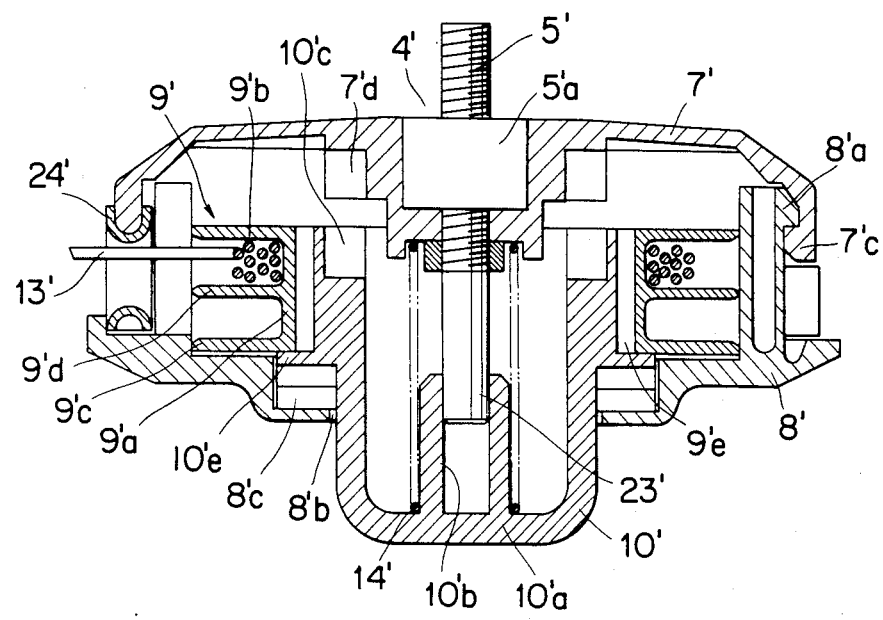
FIG. 4 is a vertical sectional view of another embodiment.

The head 4' which is rotatable in a predetermined direction comprises, as shown in a vertical sectional view of FIG. 4, an upper case 7' are a lower case 8' both of synthetic resin. Said upper case 7' is inserted with a boss member 5'a of the drive shaft 5'. Said lower case 8' is releasably attached to the upper case 7' by engaging two recesses 7'c with projections 8'a formed opposite to each other in the respective peripheral surfaces of the upper case 7' and the lower case 8'. There are provided within said head 4' a depressing member 10' of synthetic resin movable upward and dowanward, and a reel 21 of synthetic resin wound with the cord. Said reel 9' is releasably engaged with the peripheral wall of the depressing member 10'.

The depressing member 10' having a U-shaped cross section is cylindrical. In the center portion of the bottom wall 10'a of the depressing member 10', an annular guide wall 10'b is formed in which a guide shaft 23' threadedly attached to the boss member 5'a of the output shaft 5' is inserted. A coil spring 14' is interposed between the bottom wall 10'a of the depressing member 10' and the inner wall of the upper case 7' along the peripheral surface of the guide wall 10'b. A downward biasing of the coil spring 14' allows the depressing member 10' to project outwardly from the lower case 8' through a an opening 8'b formed in the center bottom portion of the lower case 8'.

Furthermore, the depressing member 10', as shown in FIG. 5a, FIG. 5b, FIG. 5c and FIG. 5d, has a brim 10'e in its periphery at a portion thereof midway taken vertically, which brim 10'e overhangs the inner surface of the lower case 8'. In the lower surface of the brim 10'e, eight ratchet teeth 22' with equal angular spacings are formed annularly with flat portions 22'c therebetween. Further, eight vertical projections 10'd with equal angular spacings are formed upward of said brim 10'e in the peripheral wall of the depressing member 10'. Further, eight ratchet teeth 10'c with equal angular spacings are formed annularly in the upper portion of the depressing member 10'. Each ratchet tooth 10'c includes a vertical surface 10'c, a slant surface 10'c2 and a tip 10'c3.

In the center portion of the inner ceiling surface of the upper case 7, eight ratchet teeth, 7'd are annularly formed, each ratchet tooth 7'd including a vertical surface 7'd, a slant surface 7'd2 and a tip 7'd3. Said slant surface 7'd2 serves as a guide surface for each ratchet tooth 10'c by permitting a stepwise rotation of the depressing member 10' rearwardly with respect to the head rotation. In the center portion of the inner surface of the lower case 8', eight recesses 21' with a vertical surface 21'a and a slant wall 21'b are formed to cooperate with the projections 22' formed in the lower surface of the brim 10'e of the depressing member 10'. Each recess 21' has a flat surface 21'c between said vertical surface 21'a and a slant surface 21'b.

The reel 9' has a body 9'a, an upper flange 9'b, a lower flange 9'c and an intermediate partition 9'd. Two lengths of the synthetic resin cord 13 are folded in half and the folded portion of the cord is secured to the intermediate partition 9'd and each end of the folded cord is wound around the body 9'a divided into upper and lower parts by the partition. Each one end of the cord 13 is extended outwardly through an eyelet 24, which is provided with a gap and nested into a slit formed in the peripheral wall of the lower case 8'.

In this case, the cord 13 is wound in the reverse direction to the rotating direction of the rotatable head 4 to prevent the wound cord 13 from loosening even if centrifugal force is exerted to the outside extention of the cord 24.

Figure 6:
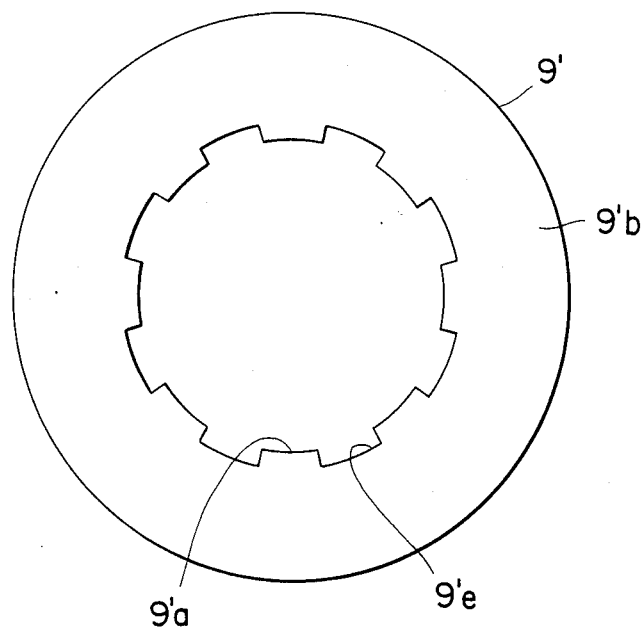
FIG. 6 is a plan view of the reel used in the embodiment of FIG. 4.

As shown in a plan view of FIG. 6, a plurality of vertical recesses 9'e are formed in the inner periphery of the body 9'a of the reel 9' with equal angular spacings therebetween. Each recesses 9'e is engaged with each projections 10'd formed in the peripheral wall of the depressing member 10', so that the reel 9' may be releasably fitted into the depressing member 10' in dovetail fashion to rotate together in the same direction. When the reel 9' and the depressing member 10' are fully engaged, the lower flange 9'c of the reel 9 abuts against the brim 10'e of the depressing member 10.

Figure 7A:
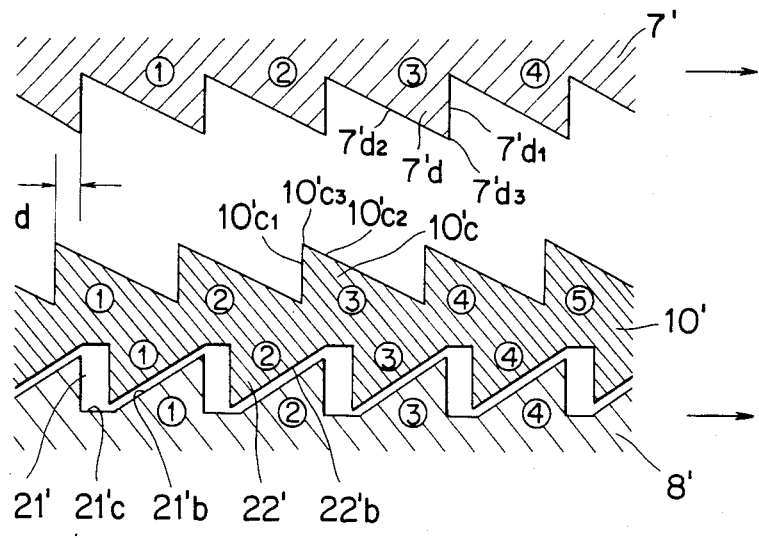
FIGS. 7a through 7d show the change in positional relationship between elements inside the head at the time of the paying out operation of the cord.
Figure 7B:
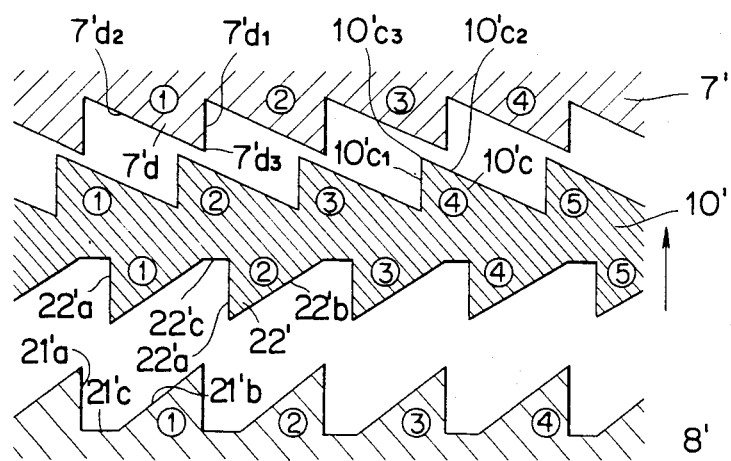
Figure 7C:
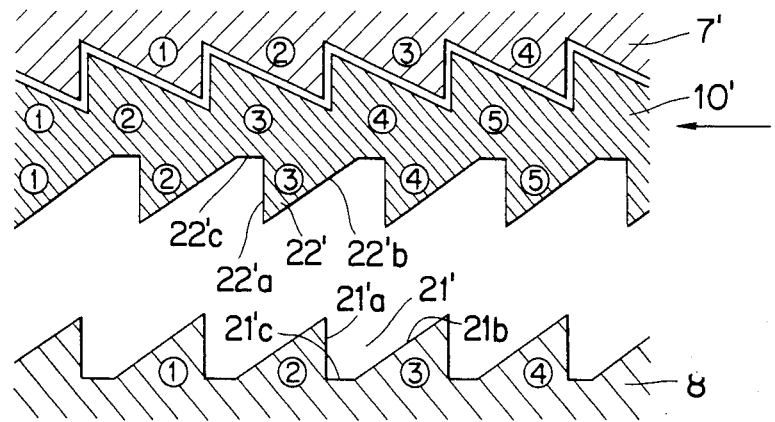
Figure 7D:
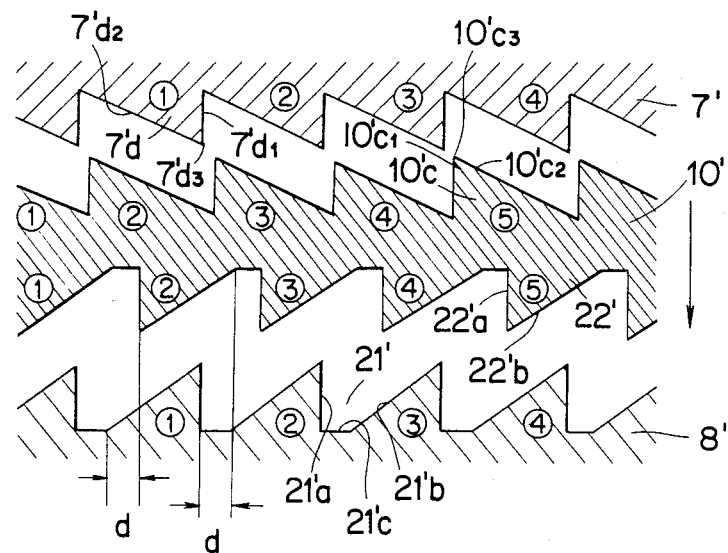

Next, the cooperative operation of the ratchet teeth 7'd and 10'c, recesses 21' and projections 22' will be described in reference to the developments in FIG. 7a through 7d. FIG. 7a shows the state in which the depressing member 10' is baised downwardly by the coil spring to maintain ratchet teeth 10'c of the depressing member 10' out of engagement with the ratchet 7'd of the upper case 7' while the projection 22' of the depressing member 10' is in engagement with the recesses 21' of the lower case 8' such that the slant surface 22'b of each projection 22' is in contact with the slant surface 21'b of each recess 21'.

When the rotatable head 4 including the upper case 7' and lower case 8' is rotated in the arrowed direction, the vertical wall 21'a of each recess 21' comes into abutment with the vertical wall 22'a of each projection 22' by travelling the distance of the flat surface 21'c allowance to rotate the depressing member 10' and the reel 21 engaged therewith are rotated together with the rotation of the rotatable head 4. As a result, centrifugal force exerts on the rotating cord 13 from the eyelet 24 to extend in a radial direction for performing a cutting operation.

The slant surfaces 7'd2 of the ratchet teeth 7'd are formed to face in a direction reverse to the head rotation while the slant surfaces 10'c2 of the ratchet teeth 10'c face said slant surfaces 7'd2. With this positional relationship, said slant surfaces serve as guide surfaces for the ratchet teeth 10'c when the ratchet teeth 7'd and 10'c come into engagement with each other. In order to assure the positive engagement of the ratchet teeth 7'd and 10'c, the tip 10'c3 of each ratchet tooth 10'c is positioned rearwardly out of phase with the tip 7'd3 of each ratchet tooth 7'd by a predetermined distance d with respect to the head rotation at least when the vertical surface 21'c of each recess 21' is advanced to contact the vertical surface 22'a of each projection 22'.

Figure 5A:
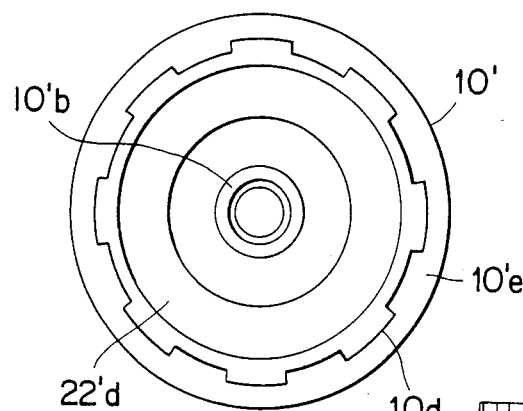
FIG. 5a is a plan view of the depressing member used in the embodiment of FIG. 4.
Figure 5B:
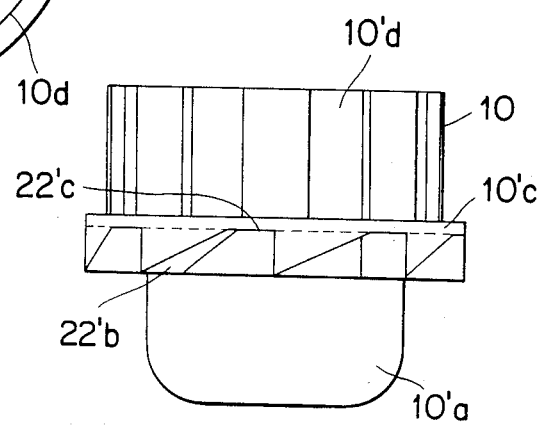
Figure 5C:
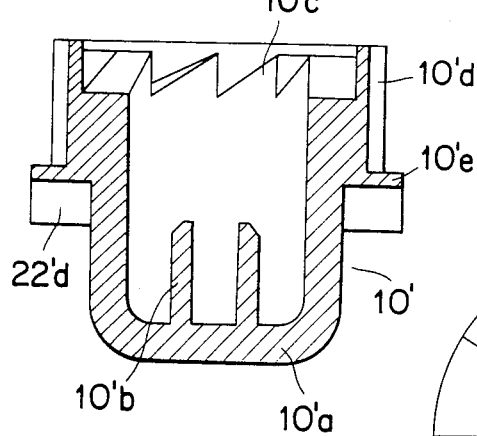
FIG. 5c is a vertical sectional view of the depressing member of FIG. 5b.
Figure 5D:
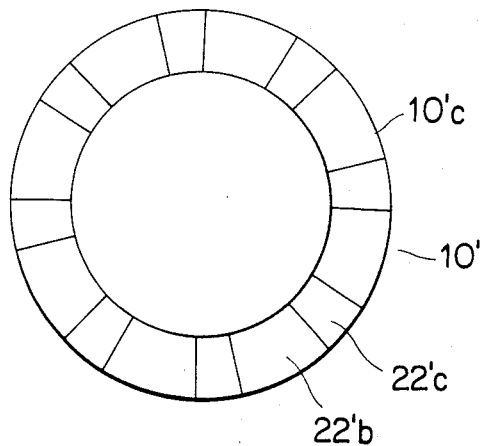
FIG. 5d is a bottom elevation of the depressing member of FIG. 5b.

Further, the flat surfaces 21'c and 22'c interposed between the slant surfaces and the vertical surfaces of the recesses 21' and projections 22' have equal width to the distance d to make doubly sure the positive engagement, FIGS. 5b through 5d show the change in the positional relationship of the elements mentioned above at the time of the paying out operation of the cord 13. When the rotation of the rotatable head 4 is stopped (the prime mover 2 remains idling) and the outer surface of the bottom 10'a of the depressing member 10' is pushed against the ground or the like, the head 4' is caused to discend against the force of the coil spring 14. It follows that the depressing member 10' rises relative to the head 4' composed of the upper case 7' and the lower case 8' in an arrowed direction shown in FIG. 5b. As a result, the projections 22' of the depressing member 10' are released from the recesses 21' of the lower case 8' and the ratchet teeth 10'c come into contact with the ratchet teeth 7'd of the upper case 7'. The reference numeral 1 to 5 referred to the respective ratchet teeth are intended for clarification of the change in the relationship of engagement.

When the depressing member 10' is further pushed against the ground, the tip 10'c3 of each ratchet tooth 10'c is caused to slide along the slant surface 7'd2 in a rearward direction until said ratchet teeth 7'd and 10'c come into full engagement as shown in FIG. 5c. That is, the depressing member 10' performs a rearward stepwise rotation in the arrowed direction in FIG. 5c. Therefore, the reel 9' is also rotated in the same direction to loosen the wound cord 13 by an amount corresponding to the rearward stepwise rotation of the reel 9'.

When the depressing member 10' is released from the depression, the head 4' including the upper case 7' and the lower case 8' is raised by biasing of the coil spring 14 and the slant surfaces 22'b of the projections 22' come into contact with the slant surfaces 21'b of the recesses 21' leaving part of the slant surfaces 21'b uncontacted by the distance of D which is larger than the distance d. Then the projections 22' slide down the slant surfaces 21'b to the left by the interval D and stop to return to the state as shown in FIG. 5a.

Further, the rotatable head 4' is rotated again, the loosened length of the cord 13' is automatically extended from the eyelet 24' by centrifugal force upon rotation of the reel 4'.

In this case, the cord 13' is easily extended without getting entangled since as described above each of two lines of the cord 24 is wound around the body 9'a divided by the intermediate partition 9'd of the reel 9'.

While in the embodiment as described above, the number of the ratchet teeth is eight, respectively, the number may be increased depending on the length of the extended cord.

This embodiment has the following effects.

(a) The molding of the reel is very easy since the reel 9' is removably engaged with the depressing member 10' having the ratchet teeth and projections formed therein.

(b) The automatic extension of the cord is very easy since the reel 9' has the intermediate partition which allows the cord to be wound in separate reel sections and payed out through outlets formed in different portions of the head periphery.

Figure 8A:
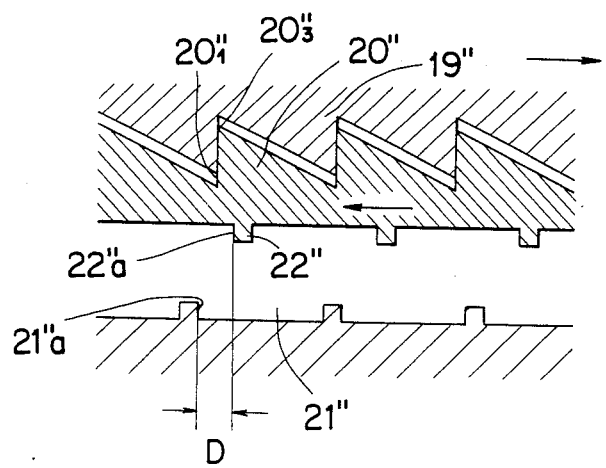
FIGS. 8a and 8b show the elements inside the head of a further embodiment of the present invention.
Figure 8B:
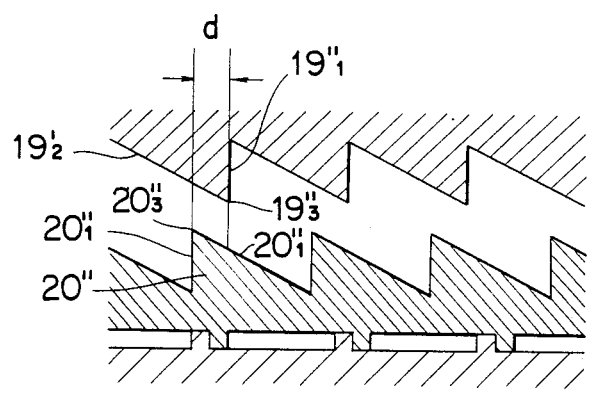

Referring to FIGS. 8a and 8b, there is shown a further embodiment of the invention. In this embodiment the recesses 21" and projections 22" are of rectangular configuration, said recesses 21" being larger than said projections 22" in their circumferential sizes. Since each recess and each projection have respective vertical rearward wall surfaces 21"a and 22"a whereas each ratchet tooth 19" and 20" have respective vertical rearward wall surfaces 19"1 and 20"1. The vertical surface 19"1 of each ratchet tooth and the vertical rearward surface 22"a of each projection 22" are formed in the same phase with each other whereas the vertical surface 20" of each ratchet tooth 20 is formed rearwardly out of phase with the vertical forward wall surface 22"b of each projection 22".

Therefore, it is evident that the tip 20"$_3$ are positioned rearwardly out of phase from the tip 19"$_3$ by the distance d when the rearward vertical surface 21"a and the rearward vertical wall surfaces 22"a are brought into contact with each other as shown in FIG. 8b.

In order to ensure this relationship, it is desired that an allowance between the rearward vertical wall surface 21"a of the recess 21" and the rearward wall surfaces 22"a of the projection 22" are equal to the above distance d or a distance D larger than the distance d as shown in FIG. 8b.

A still further embodiment of the invention will be described in conjunction with FIG. 9a through FIG. 11. The general structure of this embodiment is substantially the same as that the embodiment shown in FIGS. 1 through 3d except for the following points. That is, as shown in FIGS. 9a and 9b, a reel 9''' of synthetic resin has an upper flange 9'''b and a lower flange 9'''c and is molded into generally H-shaped into cross section.

Furthermore, 9'''a designates the body of the reel 9'''; 9'''f, an annular groove nested with one end of the coil spring for biasing the reel 9'''; and 10''', a depressing member.

In the peripheral edge of the upper flange 9'''b two slits 25''' are formed at portions diametrically opposite to each other, each being a little smaller than the diameter of the cord 13'''. As described above, the whole length of the cord is folded in half. The folded portion of the cord 13''' is secured to the body 9'''a of the reel 9'''. Two lines of the cord 13''' in parallel are wound in the same direction. When each end of the two lines of the cord 13''' is forcibly drawn into each slits 25''' formed in the upper flange 9'''b, each end of the cord 13''' is retained in said slit 25''' to prevent the wound cord 13''' from loosening since the width of the slit 25''' is formed a little smaller than the diameter of the cord 25''', as described above.

FIGS. 10a through 10c show an eyelet 24. The eyelet 24''' defining an outlet 26''' is generally U-shaped having a gap 27 at an upper portion thereof. Said gap 27''' continues to the outlet 26''', which serves as a guide aperture for the cord.

The eyelet 24''' is further formed with recesses 24'''a and 24'''b in both side walls and under wall thereof. By using these recesses, the eyelet is pressed into a cutout formed in the peripheral surface 8'''b of a lower case 8''' and opening upwardly.

Next, the incorporation of the reel 9''' will be described as follows. Each end of the cord 13''' wound around the body of the reel 9''' is retained within a slit 25''' formed in the upper flange 9'''b at a circumferential portion thereof and then the reel 9''' wound with the retained cord is inserted into the lower case 8''', as shown in FIG. 11.

In this case, each end of the cord 13''' retained within the slit 25" is positioned so as to be ready for being drawn fit into the eyelet 24'''. Then, as described in FIG. 3, each end of the cord is drawn out from the slit 25''' and lowered downwardly to be guided into the outlet 26''' through the gap 27''' of the eyelet 24'''.

As a result, each end of the cord 13''' wound around the reel 9''' may be extended from the eyelet 24''' very easily.

Referring then to FIG. 2, the lower case 8 is covered with the upper case 7 and the catch 8a of the lower case 8 is engaged with a catch hole 7a of the upper case 7. This structural relationship is entirely the same as the embodiment of FIGS. 9a through 11. In this state, the gap 27''' of the eyelet 24''' is blocked by the lower portion of the periphery wall of the upper case 7.

This embodiment has the following effects; the cord is free from loosening while the assembly of the reel and the rotatable head is very easy since the end of the cord is temporarily retained in the reel, and the gap formed in the eyelet and continuous to the outlet therein makes it easy to draw the cord temporarily retained in the slit of the reel flange out into the eyelet for paying out the cord therethrough.

The present invention has the following effects.

(a) When the cord is worn out, the cord may be extended to a desired length by such a easy operation as to push the depressing member projecting from the rotatable head against the ground.

(b) When the cord is to be payed out, the rotation of the rotatable head is stopped. This operation assures stepwise pay out of the cord, thus eliminating the dangerous and unnecessary extension of the cord.

What is claimed is:

1. An apparatus for cutting grass comprising
a rotatable head rotatable about an axis in a predetermined direction, said rotatable head connected to a drive source through switch means, said rotatable head including an upper case and a lower case releasably engaged with each other, said upper case and said lower case having respective inner surfaces, said lower case having an opening at a central bottom portion thereof;
a reel supported within said head slidably along said axis and wound with at least one cord therearound, said at least one cord being wound in a direction reverse to said predetermined direction, said reel having an upper flange and a lower flange, said upper flange, and said lower flange having upper and lower outer surfaces, respectively;
a depressing member extending from said reel and normally biased toward said central bottom portion of the lower case to project outside the rotatable head through said opening;
a plurality of first ratchet teeth formed in said upper outer surfaced of said upper flange and a plurality of second ratchet teeth formed in said inner surface of said upper case, said first and second ratchet teeth being formed annularly to face each other, each first tooth having a first slant surface facing forwardly and a first tip formed at a rearwardmost end of said first slant surface with respect to the head rotation in said predetermined direction, each second tooth having a second slant surface facing rearwardly and a second tip formed at a forwardmost end of said second surface; and
a plurality of recesses formed in said inner surface of said lower case and a plurality of projections formed in said lower outer surface of said lower flange, said recesses and said projections being sized to permit engagement with each other: and said second ratchet teeth of the upper case and said recesses of the lower case being spaced from each other by a predetermined distance such that engagement of said first with second ratchet teeth and engagement of said recesses with projections are selectively accomplished, said first tip of each first tooth being positioned rearwardly of said second tip of each second ratchet tooth during said engagement of said recesses with projections when said rotatable head is rotated.

2. An apparatus for cutting grass comprising
a rotatable head rotatable about an axis in a predetermined direction, said rotatable head being connected to a drive source through switch means, said rotatable head including an upper case and a lower case releasably engaged with each other, said upper case and said lower case having respective inner surfaces, said lower case having an opening at a central bottom portion thereof;
a reel supported within said head coaxially therewith and wound with at least one cord therearound, said at least one cord wound in a direction reverse to said predetermined direction, said reel having an upper flange and a lower flange;
a depressing member releasably attached within said reel and normally biased toward said central bottom portion of the lower case to project outside the rotatable head through said opening, said depressing member having a brim portion formed in a longitudinally intermediate portion thereof to overhang said inner surface of the lower case, said brim portion having a lower surface facing said inner surface of the lower case, said depressing member further having a top portion above said brim portion to face said inner surface of the upper case;
a plurality of first ratchet teeth formed in said top portion and a plurality of second ratchet teeth formed in said inner surface of the upper case, said first and second ratchet teeth being formed annularly to face each other, each first tooth having a first slant surface facing forwardly and a first tip formed at a rearwardmost end of said first slant surface with respect to the head rotation in said predetermined direction, each second tooth having a second slant surface facing rearwardly and a second tip formed at a forwardmost end of said second surface; and
a plurality of recesses formed in said inner surface of said lower case and a plurality of projections formed in said lower surface of said brim portion, said recesses and projections being sized to permit engagement with each other: and
said second ratchet teeth of the upper case and said recesses of the lower case being spaced from each other by a predetermined distance such that engagement between said first and second ratchet teeth and engagement of said recesses with projections are selectively accomplished, said first tip of each first tooth being positioned rearwardly of said second tip of each second ratchet tooth during said engagement of said recesses with projections when said rotatable head is rotated.

3. An apparatus for cutting grass as set forth in claim 1, wherein said reel is formed integral with said depressing member.

4. An apparatus for cutting grass as set forth in claim 2, wherein said depressing member is generally cylindrical and having a plurality of projections therearound and said reel having a cylindrical body portion having a plurality of recesses in an inner surface thereof, said recesses and said projections corresponding to each other for dovetail engagement.

5. An apparatus for cutting grass as set forth in claim 1 or claim 2, wherein said lower case of the rotatable head has an annular peripheral wall around said axis of the head, said peripheral wall having a cutout formed therein and opening upwardly and an eyelet nested in said cutout, said eyelet having a gap therein corresponding to said cutout opening, said upper flange having a slit at a circumferential portion corresponding to said eyelet.

6. An apparatus for cutting grass as set forth in claim 1 or claim 2, wherein each recess and each projection have respective forward slant wall surface adapted to guide said reel rearwardly relative to the rotatable head until said first tip of each first ratchet teeth is positioned rearwardly out of phase with said second tip of each second ratchet teeth.

7. An apparatus for cutting grass as set forth in claim 1 or claim 2, wherein said recesses and said projections are substantially of rectangular configuration, said recesses being larger than said projections in circumferential size, each recess and each projection having respective vertical rearward wall surfaces, said first tip of each first ratchet teeth being positioned rearwardly out of phase with said second tip of each second ratchet teeth when said rearward wall surfaces of each recess and projection are brought into contact with each other.

8. An apparatus for cutting grass as set forth in claim 1 of claim 2, wherein each recess and each projection have rearward wall surfaces.

9. An apparatus for cutting grass as set forth in claim 8, wherein said rearward wall surface of each projection is formed forwardly out of phase with the first tip of each first ratchet teeth whereas said rearward wall surface of each recess is formed in phase with the second tip of each ratchet teeth.

* * * * *